DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 1, 1970

881 O.G. 21

T881,002
PHOTOCONDUCTIVE MATERIALS

Jean E. Jones, % Kodak Park Works,
Rochester, N.Y. 14650

Filed Apr. 20, 1970, Ser. No. 30,226
Int. Cl. C03g *5/00, 7/00*
U.S. Cl. 96—1.6
No Drawing. 14 Pages Specification n-Type photoconductive compositions are prepared from polyester resins such as poly(ethylene alkaryloxyalkylene terephthalate), poly(ethylene alkaryloxyalkylene isophthalate) resins and a Lewis acid such as trinitrofluorenone. The two materials are added together in the presence of a solvent, mixed well and coated to form a charge transfer complex having n-type photoconductive properties. The resultant charge transfer complex has an enhanced photoconductive response over trinitrofluorenone in other typical binders. This enhanced response is mainly the result of an extension of the radiation absorption well into the visible range of the spectrum. A particularly useful polyester resin for preparing the charge transfer complexes is poly(4,4′-isopropylidenebisphenoxy ethyl-co-ethylene terephthalate). Electrophotographic elements can be formed by preparing coatings of the charge transfer complex on a support such as an electrically conducting film base. The compositions used in such elements can also be sensitized with a variety of dyes. Various electron-accepting cyanine, merocyanine and azacyanine dyes are particularly useful.